(12) United States Patent
Matsui et al.

(10) Patent No.: US 8,685,564 B2
(45) Date of Patent: Apr. 1, 2014

(54) ACTIVE MATERIAL FOR RECHARGEABLE BATTERY

(75) Inventors: Masaki Matsui, Ann Arbor, MI (US); Timothy Sean Arthur, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 13/477,232

(22) Filed: May 22, 2012

(65) Prior Publication Data

US 2012/0328935 A1  Dec. 27, 2012

Related U.S. Application Data

(60) Provisional application No. 61/499,797, filed on Jun. 22, 2011, provisional application No. 61/594,689, filed on Feb. 3, 2012.

(51) Int. Cl.
*H01M 4/58* (2010.01)
*H01M 10/40* (2006.01)

(52) U.S. Cl.
USPC .......... 429/218.1; 429/188; 429/122

(58) Field of Classification Search
None
See application file for complete search history.

(56) References Cited

U.S. PATENT DOCUMENTS

| | | | |
|---|---|---|---|
| 3,485,674 A | 12/1969 | Sprague et al. | |
| 7,659,035 B2 | 2/2010 | Yamamoto et al. | |
| 8,197,967 B2 * | 6/2012 | Sugie et al. | 429/225 |
| 2001/0049060 A1 | 12/2001 | Aurbach et al. | |
| 2005/0106470 A1 | 5/2005 | Yoon et al. | |
| 2009/0068568 A1 | 3/2009 | Yamamoto et al. | |
| 2010/0104951 A1 | 4/2010 | Iwama et al. | |
| 2010/0136438 A1 | 6/2010 | Nakayama et al. | |
| 2010/0143800 A1 * | 6/2010 | Sawada et al. | 429/220 |
| 2011/0014505 A1 * | 1/2011 | Bradwell et al. | 429/51 |
| 2011/0111286 A1 * | 5/2011 | Yamamoto et al. | 429/188 |
| 2012/0171577 A1 * | 7/2012 | Ryu et al. | 429/326 |

FOREIGN PATENT DOCUMENTS

| | | |
|---|---|---|
| JP | 11-345610 A | 12/1999 |
| JP | 2000-012016 A | 1/2000 |
| JP | 2009064730 A | 3/2009 |

OTHER PUBLICATIONS

Hitohiko H. et al., "Anode Behaviors of Magnesium-Antimony Intermetallic Compound for Lithium Secondary Battery," Journal of Power Sources, vol. 123:216-221, 2003.*

* cited by examiner

*Primary Examiner* — John S Maples
(74) *Attorney, Agent, or Firm* — Gifford, Krass, Sprinkle, Anderson & Citkowski, P.C.

(57) ABSTRACT

A magnesium battery includes a first electrode including an active material and a second electrode. An electrolyte is disposed between the first electrode and the second electrode. The electrolyte includes a magnesium compound. The active material includes an inter-metallic compound of magnesium and antimony. The active material also includes antimony or an alloy of bismuth and antimony.

7 Claims, 11 Drawing Sheets

ACTIVE MATERIAL FOR RECHARGEABLE BATTERY

REFERENCE TO RELATED APPLICATIONS

This application claims priority of U.S. Provisional Patent Application Ser. No. 61/499,797, filed Jun. 22, 2011, and U.S. Provisional Patent Application Ser. No. 61/594,689, filed Feb. 3, 2012, the entire contents of which are incorporated herein by reference.

FIELD OF THE INVENTION

The invention relates to electrochemical devices such as batteries, in particular rechargeable batteries, such as a rechargeable magnesium battery.

BACKGROUND OF THE INVENTION

Rechargeable batteries, such as lithium-ion batteries, have numerous commercial applications. Capacity density is an important characteristic, and higher capacity densities are desirable for a variety of applications.

A magnesium ion in a magnesium or magnesium ion battery carries two electrical charges, in contrast to the single charge of a lithium ion. Improved electrode materials would be very useful in order to develop high capacity density batteries.

SUMMARY OF THE INVENTION

In one aspect there is disclosed a magnesium battery that includes a first electrode including an active material and a second electrode. An electrolyte is disposed between the first electrode and the second electrode. The electrolyte includes a magnesium compound. The active material includes an inter-metallic compound of magnesium and antimony.

In a further aspect, there is disclosed a magnesium ion battery that includes a first electrode including an active material and a second electrode. An electrolyte is disposed between the first electrode and the second electrode. The electrolyte includes a magnesium compound. The active material includes an inter-metallic compound of magnesium and antimony.

In another aspect, there is disclosed a magnesium battery that includes a first electrode including an active material and a second electrode. An electrolyte is disposed between the first electrode and the second electrode. The electrolyte includes a magnesium compound. The active material includes antimony or an alloy of bismuth and antimony.

In another aspect, there is disclosed a magnesium ion battery that includes a first electrode including an active material and a second electrode. An ionic electrolyte is disposed between the first electrode and the second electrode. The electrolyte includes a magnesium compound. The active material includes antimony or an alloy of bismuth and antimony.

BRIEF DESCRIPTION OF THE FIGURES

FIG. 9b is a plot of EDX spectra of the electrodeposited $Bi_{0.55}Sb_{0.45}$ alloy after the alloy has been cycled 15.5 times.

FIG. 9c is a plot of EDX spectra of the electrodeposited $Bi_{0.55}Sb_{0.45}$ alloy after the alloy has been cycled 20 times.

DETAILED DESCRIPTION OF THE INVENTION

Examples of the present invention include electrochemical devices, such as batteries, in particular rechargeable batteries. Examples include magnesium-based batteries, and specifically to materials used as active materials within the electrodes of a magnesium battery. In particular, an example battery includes an electrode active material that includes antimony. For example, the active material may include antimony and an inter-metallic compound of antimony and magnesium. The improved active materials described herein may be used within the cathode and/or anode of an example battery.

In a specific example, which is not intended to be limiting, an improved active material for a magnesium battery includes antimony and an inter-metallic compound of antimony and magnesium having the formula $Mg_3Sb_2$.

A rechargeable magnesium battery is expected to be a high energy battery system, because of its high capacity density. In particular, as compared to lithium-ion batteries, the magnesium ion transfers two electrons per magnesium ion. However, previously there have been no good cathode or anode active materials which can fully utilize the advantage of the high capacity density.

In examples of the present invention, improved active materials including antimony and an inter-metallic compound of antimony and magnesium are used as the active material for a rechargeable battery. A particular example of an improved active material includes antimony and $Mg_3Sb_2$. The active material may further include an electrically conductive material and a binder. Examples of electrically conducting materials include carbon particles, such as carbon black. Example binders include various polymers, such as PVdF, PTFE, SBR, or PolyImide.

The electrolyte layer may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt.

In the example of a battery including an electrode having a cathode active material it may be present as a sheet, ribbon, particles, or other physical form. Cathode active materials may include materials that show an electrochemical reaction at a higher electrode potential than the first electrode or anode. An example of one cathode active material is a transition metal oxide or sulfide. An electrode containing the cathode active material may be supported by a current collector.

A current collector may include a metal or other electrically conducting sheet on which the electrode is supported. A metal sheet may include aluminum, copper, or other metal or alloy. In some examples, a metal housing may provide the function of a current collector. Other conducting materials, such as electrically conducting polymers, may be used as the current collector.

A binder used in an electrode may include any material capable of binding the electrode components. Many binders are known in the battery arts, for example various polymer binders are known and can be used.

Figure 1:
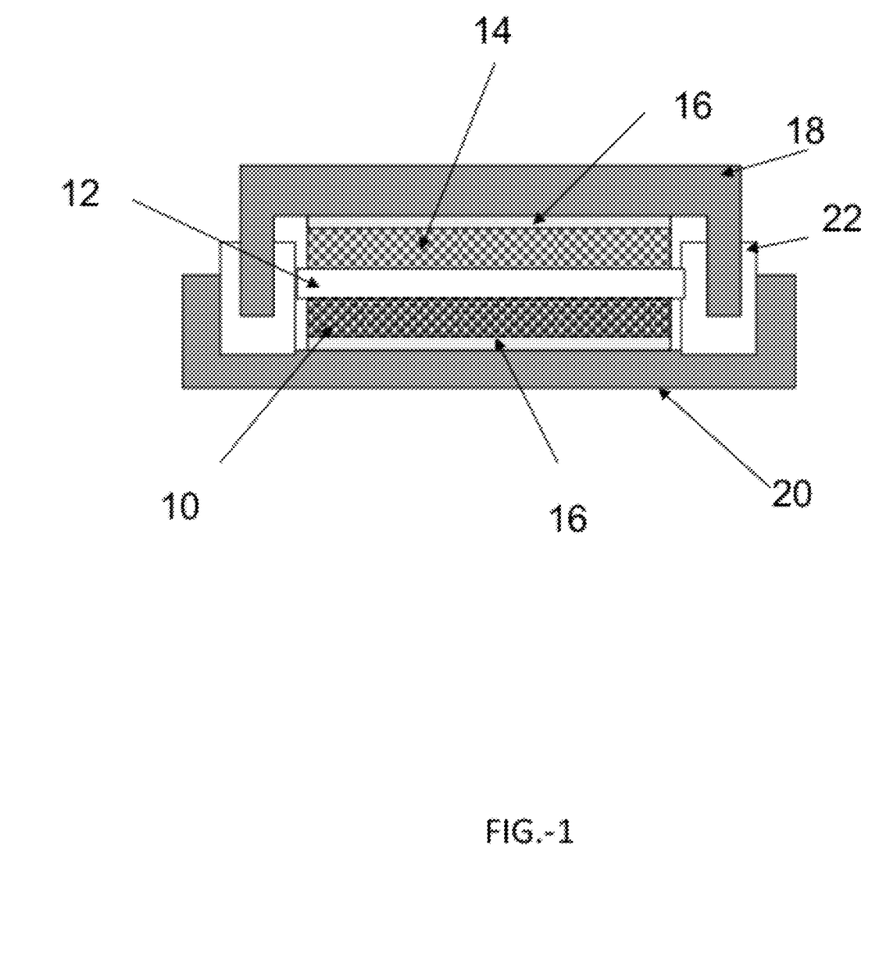
FIG. 1 is a diagram of a magnesium battery having a positive electrode containing a cathode active material and a negative electrode including a novel active material.

FIG. 1 shows a rechargeable magnesium-ion battery having an improved negative electrode active material. The battery includes a positive electrode 10 including a cathode active material, an electrolyte layer 12, a negative electrode 14, current collector 16, negative electrode housing 18, positive electrode housing 20, and sealing gasket 22. The electrolyte layer 16 includes a separator soaked in electrolyte solution, and the positive electrode 14 is supported by the current collector 16. In this example, the negative electrode includes an improved active material according to an example of the present invention, conductive carbon, and a binder. For example, the negative electrode may include bismuth and an intermetallic compound of magnesium such as $Mg_3Sb_2$.

In another embodiment as shown in FIGS. 5-11, improved active materials including an alloy of antimony and bismuth are used as the active material for a rechargeable battery. In a specific example, which is not intended to be limiting, an improved active material for a magnesium battery includes an alloy of antimony and bismuth.

In this context, the term "alloy" refers to a mixture containing two or more metals, where the elements in the alloy are fused together or dissolve into each other when molten. For example, alloys may include $Bi_{1-x}Sb_x$ where x ranges from 0.10 to 0.60. Particular examples of an improved active material include alloys of antimony and bismuth having the formula $Bi_{0.55}Sb_{0.45}$ or $Bi_{0.88}Sb_{0.12}$.

In one aspect, an electrolyte is disposed between the first electrode and the second electrode. The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt.

The electrolyte layer may include a separator that helps maintain electrical isolation between the positive and negative electrodes. A separator may include fibers, particles, web, porous sheet, or other forms of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

In the example of a battery including an electrode having a cathode active material it may be present as a sheet, ribbon, particles, or other physical form. Cathode active materials may include materials that show an electrochemical reaction at a higher electrode potential than the first electrode or anode. An example of one cathode active material is a transition metal oxide or sulfide. An electrode containing the cathode active material may be supported by a current collector.

A current collector may include a metal or other electrically conducting sheet on which the electrode is supported. A metal sheet may include aluminum, copper, or other metal or alloy. In some examples, a metal housing may provide the function of a current collector. Other conducting materials, such as electrically conducting polymers, may be used as the current collector.

The antimony bismuth alloy may be electrodeposited on the current collector. Electrodeposition of the alloy deposits the anode directly on the surface of the current collector. Electrodeposition is advantageous in that it eliminates the need for binders and electronic conductors and thereby decreases the overall weight of the anode material. In one embodiment of the invention, 1-10 mg of the anode active material is deposited uniformly on the current collector in a thin film. The size of the bismuth antimony alloy particles electrodeposited on the current collector range from about 50 nm to about 250 nm.

Figure 5:
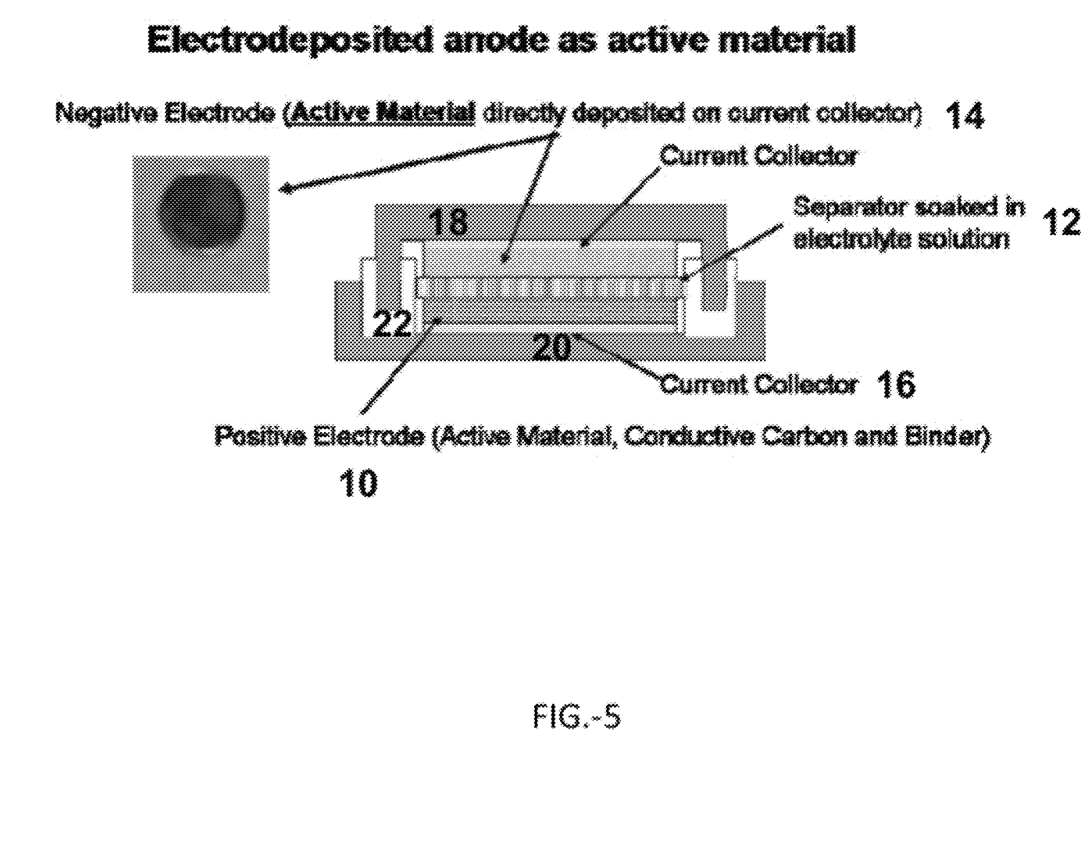
FIG. 5 is a diagram of a magnesium battery having a positive electrode containing a cathode active material and a negative electrode including a novel active material.

FIG. 5 shows a rechargeable magnesium-ion battery having an improved negative electrode active material. The battery includes a positive electrode 10 including a cathode active material, an electrolyte layer 12, a negative electrode 14, current collector 16, negative electrode housing 18, positive electrode housing 20, and sealing gasket 22. The electrolyte layer 12 includes a separator soaked in electrolyte solution, and the positive electrode 10 is supported by the current collector 16. In this example, the negative electrode includes an improved active material according to an example of the present invention. For example, the negative electrode is an alloy of bismuth and antimony.

EXAMPLES

Antimony powder was purchased from Sigma Aldrich (CAS 7440-36-0) and mixed with acetylene black (DENKA HS-100) and PVdF (Kreha KF-Polymer) as binder to prepare a paste respectively. Prepared pastes were coated on Ni or Cu current collector by conventional electrode preparation process. A Sb/Mg cell was fabricated with a commercial electrochemical cell (Tomcell TJAC). Grignard based electrolyte (0.25M EtMgCl-Me, AlCl in THF) was prepared as electrolyte solution and Mg metal disc (ESPI metals 3N purity) was prepared as a counter electrode. A galvanostatic charge-discharge test for the Sb/Mg cell was operated at 0.02 C (20 μA l cell).

Figure 2:
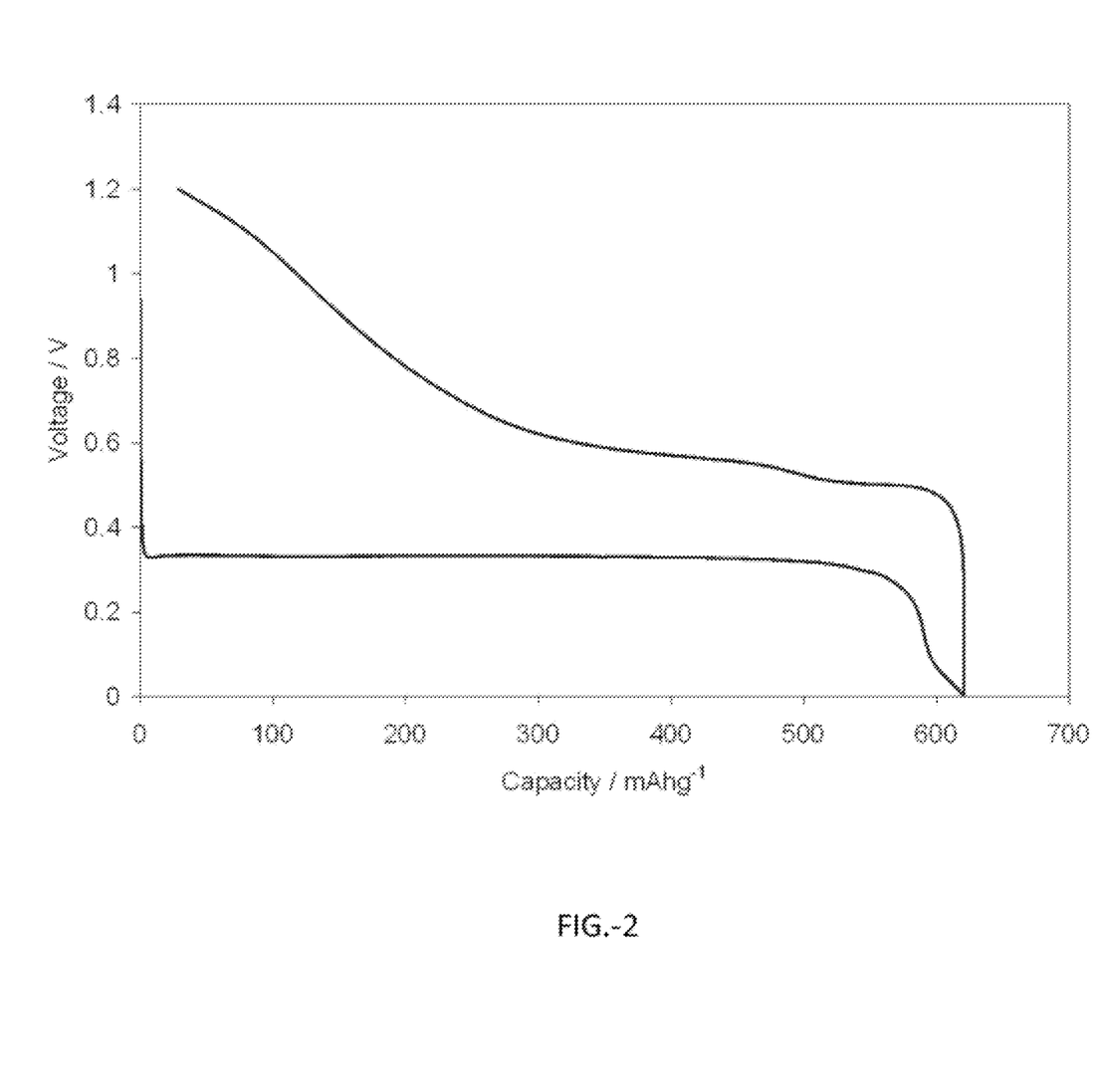
FIG. 2 is a voltage profile of an anode active material including antimony as a function of the specific capacity tested by magnesium/antimony half cell.

FIG. 2 shows a charge/discharge curves for an anode active material of antimony and intermetallic compound of antimony and magnesium. An antimony-magnesium cell having an electrolyte of 0.25M EtMgCl-2Me2AlCl was run at a current of 20 microamp (0.02 C). As can be seen from the profile, the electrode configurations showed a specific capacity of more than 600 milliamp-hours/gram. The profile shows the specific capacity of approximately 620 milliamp-hours/gram.

Examples of the present invention include batteries having one or more cells, electrically connected in parallel and/or series, in any appropriate form factor such as button cells, other round cells, cylindrical cells, rectangular or other prismatic cells, and the like. Example apparatus also include rolled-up battery forms, and combinations of a battery with a supercapacitor and/or fuel cell, and the like.

Examples of the present invention also include various electrically-powered apparatus, such as consumer electronic devices, medical devices, electric or hybrid vehicles, or other apparatus including batteries according to examples of the present invention.

Examples of the present invention include both primary (non-rechargeable, e.g. magnesium batteries) and secondary (rechargeable, e.g. magnesium ion) batteries. Specific examples include rechargeable magnesium-ion batteries. The term magnesium-based battery includes both primary and secondary batteries, i.e. both magnesium batteries and magnesium-ion batteries. Examples of the present invention include any magnesium-based battery, including rechargeable magnesium-ion batteries having a capacity density greater than conventional lithium-ion rechargeable batteries.

Electrodes may be fabricated by any suitable method. For example, a paste may be formed of particles of the active material, a binder, and an electron-conducting material (e.g. graphitic carbon particles or carbon black). The paste may be deposited on an electrically conducting substrate, such as a current collector, and heat treated as necessary.

An improved process of fabricating a battery, such as a rechargeable magnesium-ion battery, includes providing first and second electrodes separated by an electrolyte, at least one electrode including bismuth and an inter-metallic of antimony and magnesium such as $Mg_3Sb_2$.

Figure 3:
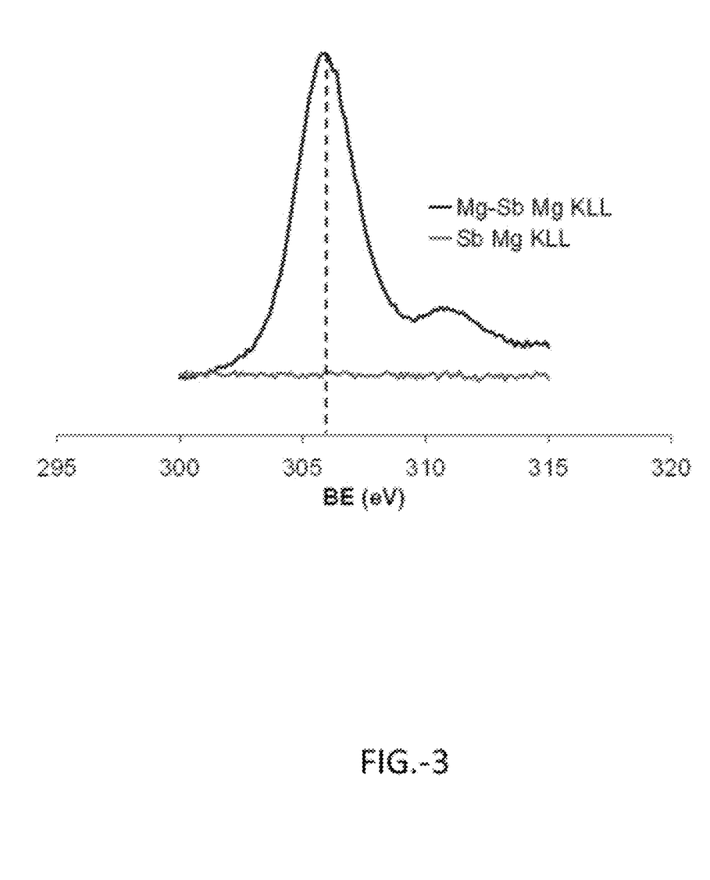
FIG. 3 is a plot of a XPS HRES spectra of the Mg KLL region for an electrode having antimony.
Figure 4:
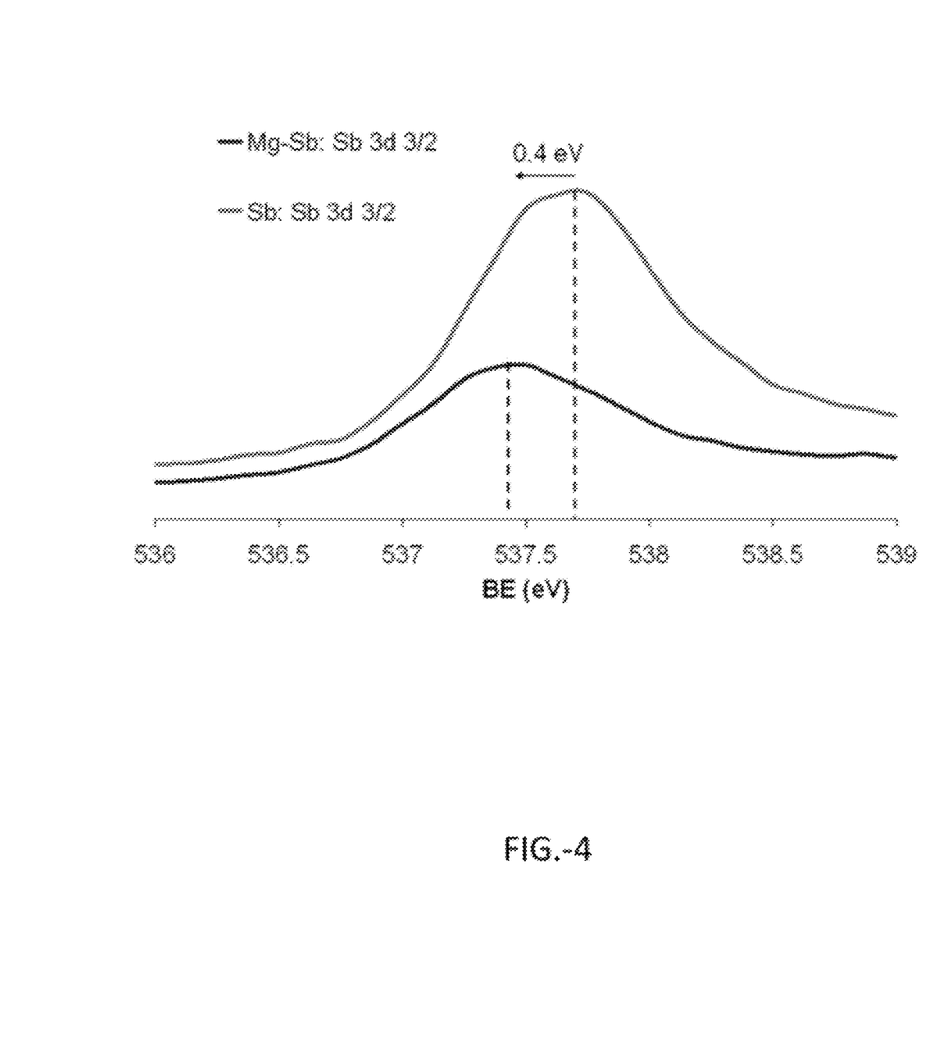
FIG. 4 is a plot of a XPS HRES spectra of the Sb 3d 3/2 region for an electrode having antimony.

Referring to FIGS. 3 and 4 there are shown plots that confirm the electrochemical intercalation of Mg2+ into an antimony material. The plots were generated in an XPS apparatus for an electrode material that includes antimony. The electrode material was prepared by electrodepositing antimony metal onto a copper foil from an aqueous solution of $Sb_2O_3$ and citric acid. The spectra of FIGS. 3 and 4 were taken of the electrode following the electro-deposition and after electrochemical reduction in a two electrode Swagelok cell (Mg—Sb).

As shown in FIG. 3, an Mg KLL in the HRES spectrum of Mg—Sb is displayed. To differentiate between $Mg^{2+}$ and $Mg^0$, the kinetic energy (KE) of the KLL transition peak is calculated with the equation: KE=BE−U (U: X-ray energy). The KE of the Mg—Sb Mg KLL transition of FIG. 4 is 1180.6 eV, which is indicative of $Mg^{2+}$. $Mg^0$ typically shows a KE=1186.0 eV (NIST database).

Referring to FIG. 4, there is shown a slight shift in BE of the Sb 3d 3/2 peak of the Mg—Sb material in comparison to the Sb material. In the figure, the peak shift is −0.4 eV, indicating a lower oxidation state of Sb and representative of $Mg^{2+}$ intercalation.

Electrodeposition of Anodes.

All chemicals for electrodeposition were obtained from Sigma-Aldrich. The electrodeposition of bismuth metal was done from a 0.08 M solution of bismuth nitrate pentahydrate ($Bi(NO_3)_3 \cdot 5H_2O$) in dimethyl sulfoxide (DMSO). The electrodeposition of $Bi_{0.88}Sb_{0.12}$ was done from a 0.06 M $Bi(NO_3)_3 \cdot 5H_2O$ and 0.02 M of antimony chloride ($SbCl_3$) solution in DMSO. The electrodeposition of $Bi_{0.55}Sb_{0.45}$ was done from a 0.04 M $Bi(NO_3)_3 \cdot 5H_2O$ and 0.04 M $SbCl_3$ solution in DMSO. The electrodeposition of antimony metal was done in 2 ways: 1) from a 0.08 M $SbCl_3$ solution in DMSO and 2) from a 0.025 M solution of antimony oxide ($Sb_2O_3$) and 0.4 M citric acid in water at a pH of 6.0. The electrodeposition from DMSO solutions were done potentiostatically at −1.02 V vs Ag/AgCl. The electrodeposition from $H_2O$ solutions were done at −1.2 V vs Ag/AgCl.

All anodes were deposited in a three-electrode cell versus Ag/AgCl using a high-surface area Pt-mesh counter electrode. Working electrodes (15 mm D, 1.77 cm$^2$) purchased from Alfa-Aesar, were made from 99.999% copper foil with 5 nm of titanium and 200 nm of platinum sputtered onto one surface. All electrodes were weighed directly before and after deposition/drying to determine the mass of the active anode material. Anodes were dried under vacuum and stored in an argon filled glovebox ($O_2$ and $H_2O$<0.1 ppm) until cell assembly.

The electrolyte used in these examples was a mixture of 2 mL of ethylmagnesium chloride, 1 mL of diethylaluminum chloride and 13 mL of anhydrous tetrahydrofuran. All chemicals were purchased from Sigma-Aldrich and used as received. 100 μm thick $Mg_{(m)}$ disks, purchased from ESPI Metals, were used as the anodes in all half-cell experiments. Galvanostatic testing was performed with a BioLogic VMP3 multistat instrument. C-rates were calculated with the measured anode mass assuming magnesiation to $Mg_3M_2$ (M=Bi, Sb or $Bi_{1-x}Sb_x$) states. The terminology for the cycling is defined as discharge meaning reduction and magnesiation of the alloys, and charge meaning oxidation and demagnesiation. X-ray diffraction was conducted using a Rigaku automated multipurpose X-ray diffractometer (Smartlab). Scanning electron microscopy images were taken with a JOEL (7500 F) filed emission microscope.

Figure 6:
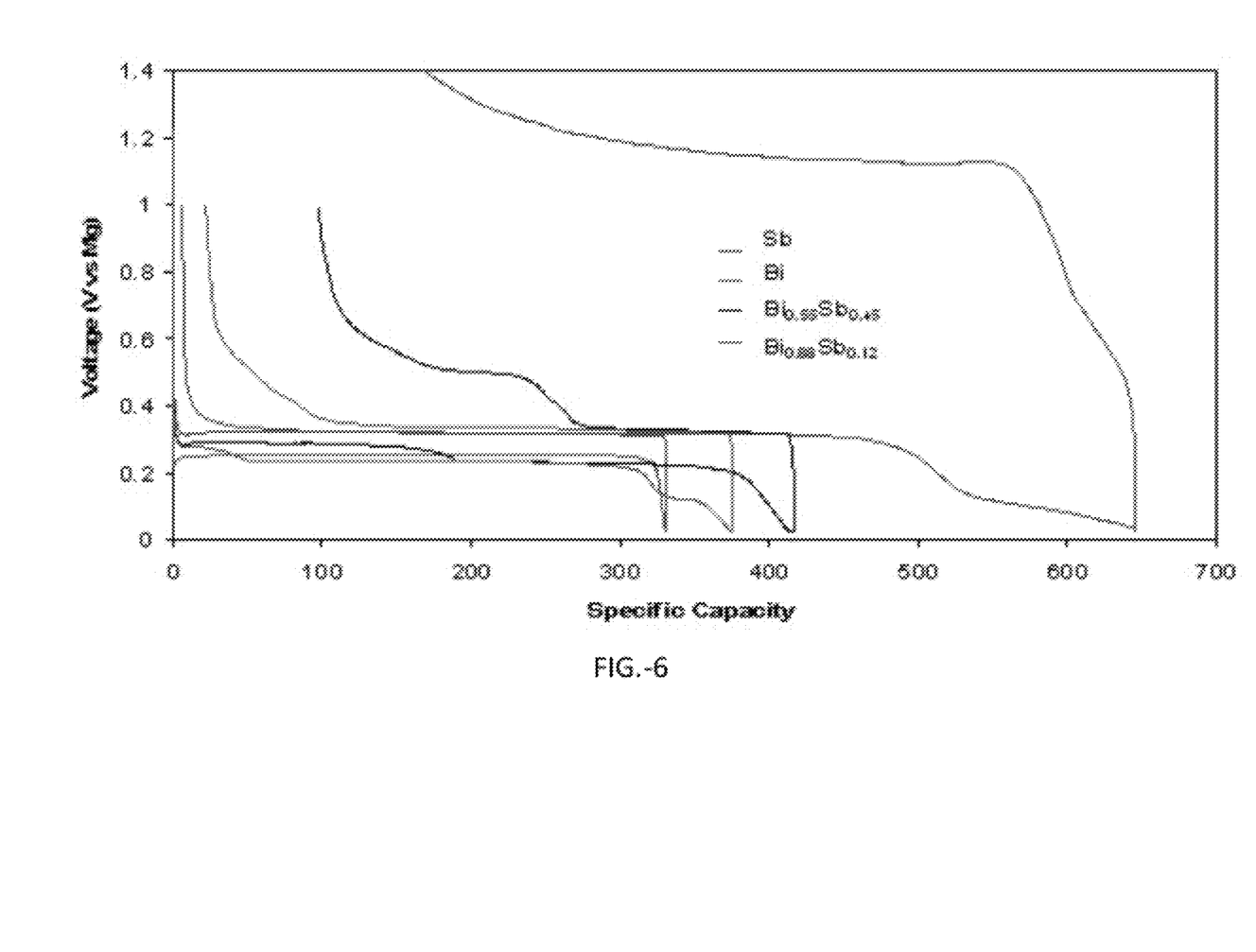
FIG. 6 is a plot of the galvanostatic oxidation (extraction) of $Mg^{2+}$ from electrodeposited antimony, bismuth, $Bi_{0.55}Sb_{0.45}$ and $Bi_{0.88}Sb_{0.12}$ anodes at a 0.01 C rate.

FIG. 6 is a plot of the galvanostatic reduction and oxidation of $Mg^{2+}$ from electrodeposited antimony, bismuth, $Bi_{0.55}Sb_{0.45}$ and $Bi_{0.88}Sb_{0.12}$ anodes at a 0.01 C rate. The Bi and Sb anodes magnesiate at 0.25 V and 0.32 V versus Mg, respectively, which indicates that $Mg_3Bi_2$ has a potential closer to $Mg_{(m)}$. The lighter Sb has a higher initial capacity than Bi, 650 mAhg$^{-1}$ and 335 mAhg$^{-1}$, respectively. By alloying Bi and Sb, improvements to the energy density are accomplished by lowering the discharge potential of Sb and increasing the capacity of Bi. For the electrodeposited $Bi_{0.88}Sb_{0.12}$ and $Bi_{0.55}Sb_{0.45}$ alloys, the $Mg^{2+}$ insertion occurs at multiple potential plateaus, one between 0.27-0.29 V and one at 0.23 V versus Mg. Since Sb magnesiates at a more positive voltage than Bi, the 0.27-0.29 V plateau for the $Bi_{1-x}Sb_x$ alloys is assigned as the magnesiation of the Sb. Without being bound by theory, it is hypothesized that the lower potential needed for magnesiation into the $Bi_{1-x}Sb_x$ alloy compared to the Bi and Sb electrodes may be due to the morphology of the small particle deposition of the $Bi_{1-x}Sb_x$ alloy.

The galvanostatic oxidation of $Mg^{2+}$ from Bi, Sb, $Bi_{0.88}Sb_{0.12}$, and $Bi_{0.55}Sb_{0.45}$ at a 0.01 C rate are also shown in FIG. 6. For Bi, a very flat plateau at 0.32 V versus Mg is observed, and the anode charges with 98% columbic efficiency. For the alloys, there are 2 plateaus for $Mg^{2+}$ extraction, one at 0.33 V and 0.5 V versus Mg. The inclusion of Sb decreases the coulumbic efficiency for the first cycles, which are 94%, 82%, and 74% for $Bi_{0.88}Sb_{0.12}$, $Bi_{0.55}Sb_{0.45}$ and Sb respectively.

Figure 7:
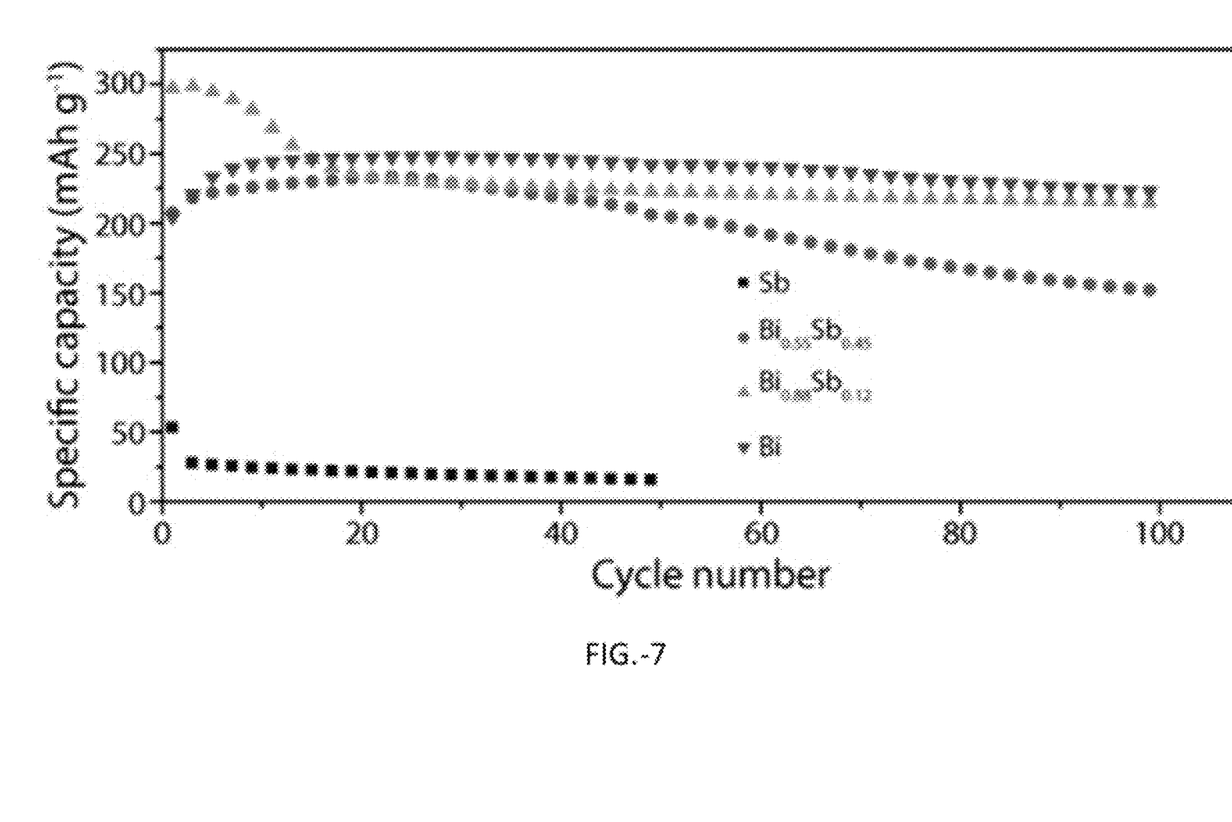
FIG. 7 is the discharge capacity versus cycle number for the electrodeposited antimony, bismuth, $Bi_{0.55}Sb_{0.45}$ and $Bi_{0.88}Sb_{0.12}$ anodes at a 1 C rate.
Figure 8:
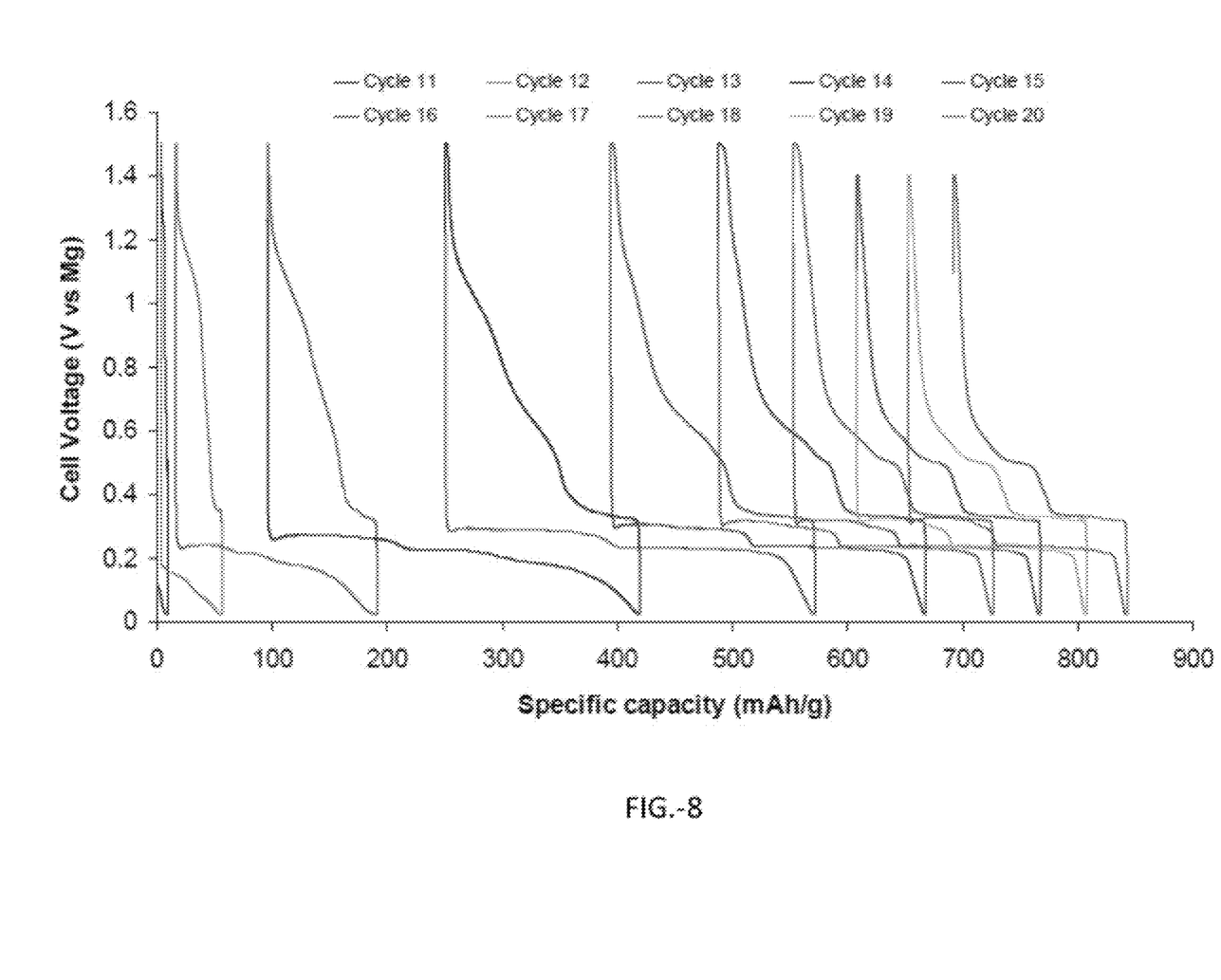
FIG. 8 is a voltage profile of an anode active material including a $Bi_{0.55}Sb_{0.45}$ alloy as a function of the specific capacity tested by magnesium half cell.

FIG. 7 is the discharge capacity versus cycle number for the electrodeposited antimony, bismuth, and $Bi_{0.55}Sb_{0.45}$ and $Bi_{0.88}Sb_{0.12}$ anodes at a 1 C rate. As opposed to initial discharge at 0.01 C, Sb suffers from low initial capacity and capacity fading at higher rates. At 1 C, $Bi_{0.88}Sb_{0.12}$ has the largest initial specific capacity, reaching a maximum capacity at 298 $mAhg^{-1}$ before dropping to 215 mAhg by the $100^{th}$ cycle. The $Bi_{0.55}Sb_{0.45}$ alloy's highest specific capacity occurs at 235 $mAhg^{-1}$ at the $22^{nd}$ cycle, fading to 151 $mAhg^{-1}$ by the $100^{th}$ cycle. The Bi anode has a specific capacity of 247 $mAhg^{-1}$ at the $20^{th}$ cycle and retains a specific capacity of 222 $mAhg^{-1}$ at the $100^{th}$ cycle. Sb displayed a very small capacity of 16 $mAhg^{-1}$ at the $50^{th}$ cycle.

Figure 9A:
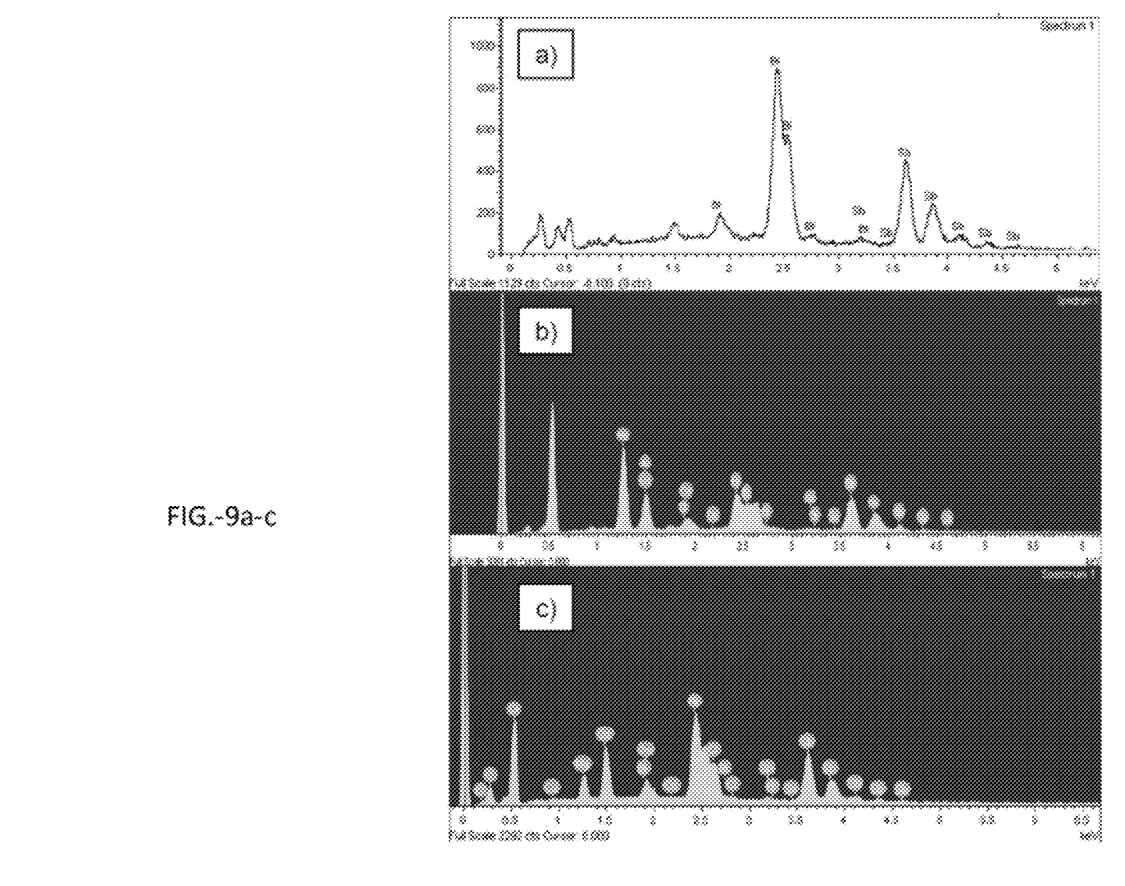
FIG. 9a is a plot of EDX spectra of the electrodeposited $Bi_{0.55}Sb_{0.45}$ alloy.

FIGS. 9a-c are plots of EDX spectra of the electrodeposited $Bi_{0.55}Sb_{0.45}$ alloy before cycling, after cycling 15.5 times, and after 20 cycles. These plots confirm the electrochemical intercalation of $Mg^{2+}$ into an antimony material. The appearance of a Mg peak at 1.25 keV after 15.5 cycles is the successful insertion of $Mg^{2+}$ into the allow during electrochemical reaction. The decrease in intensity of the Mg peak at 1.25 keV is the successful removal of $Mg^{2+}$ from the alloy during electrochemical oxidation.

Figure 10:
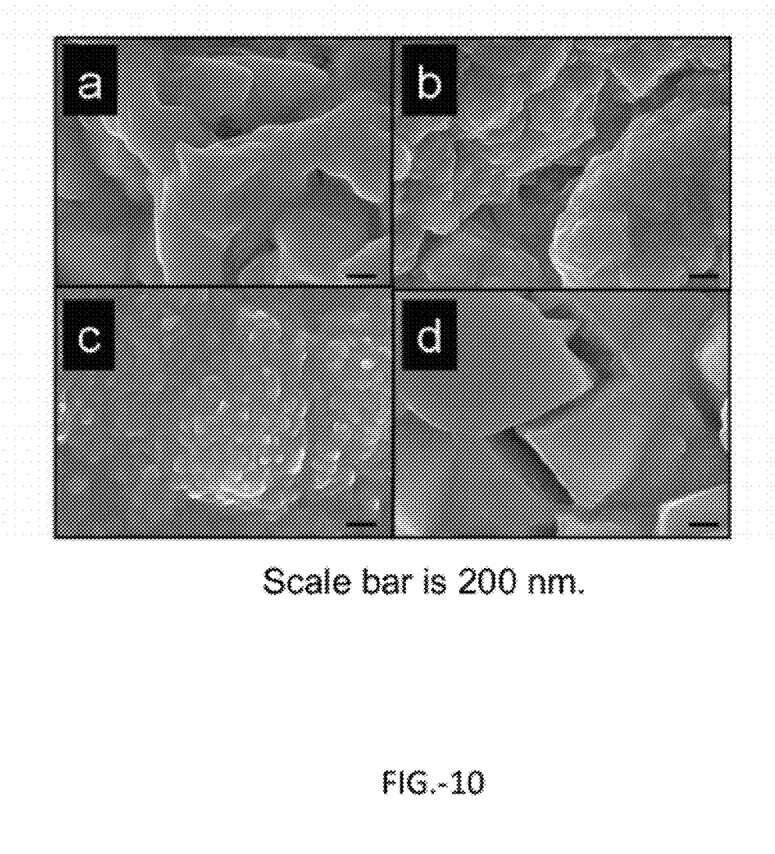
FIG. 10 shows scanning electron microscope (SEM) images of the a) bismuth, b) $Bi_{0.88}Sb_{0.12}$, c) $Bi_{0.55}Sb_{0.45}$ and d) Sb films. Bi and Sb films have grain sizes >500 nm.

FIG. 10 are scanning electron microscope (SEM) images of the as-deposited a) bismuth, b) $Bi_{0.88}Sb_{0.12}$, c) $Bi_{0.55}Sb_{0.45}$ and d) Sb films. Bi and Sb films have grain sizes >500 nm.

Figure 11:
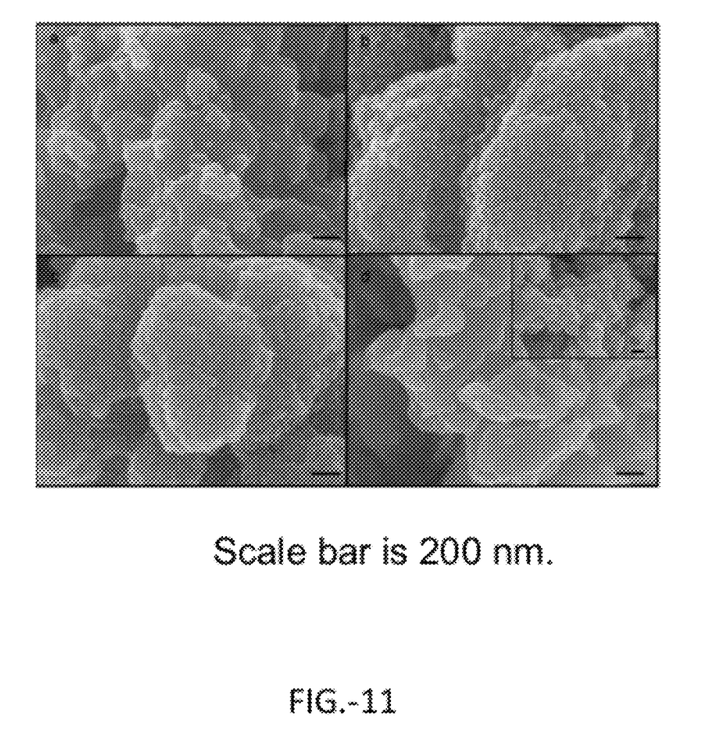
FIG. 11 shows SEM micrographs of a) bismuth, b) $Bi_{0.88}Sb_{0.12}$, c) $Bi_{0.55}Sb_{0.45}$ and d) Sb films after cycling at a 1 C rate for 45.5 cycles.

FIG. 10 are SEM micrographs of the a) bismuth, b) $Bi_{0.88}Sb_{0.12}$, $Bi_{0.55}Sb_{0.45}$ and d) Sb films after cycling at a 1 C rate for 45.5 cycles. The $Bi_{1-x}Sb_x$ alloy particles are slightly smaller after cycling, approximately 20 nm<x<50 nm, as compared to the as-deposited material.

Examples of the present invention also include batteries having one or more cells, electrically connected in parallel and/or series, in any appropriate form factor such as button cells, other round cells, cylindrical cells, rectangular or other prismatic cells, and the like. Example apparatus also include rolled-up battery forms, and combinations of a battery with a supercapacitor and/or fuel cell, and the like.

In addition, examples of the present invention include various electrically-powered apparatus, such as consumer electronic devices, medical devices, electric or hybrid vehicles, or other apparatus including batteries according to examples of the present invention.

Examples of the present invention include both primary (non-rechargeable, e.g., magnesium batteries) and secondary (rechargeable, e.g., magnesium ion) batteries. Specific examples include rechargeable magnesium-ion batteries. The term magnesium-based battery includes both primary and secondary batteries, i.e., both magnesium batteries and magnesium-ion batteries. Examples of the present invention include any magnesium-based battery, including rechargeable magnesium-ion batteries having a capacity density greater than conventional lithium-ion rechargeable batteries.

An improved process of fabricating a battery, such as a rechargeable magnesium-ion battery, includes providing first and second electrodes separated by an electrolyte, at least one electrode including an alloy of bismuth and antimony of the form $Bi_{1-x}Sb_x$ where x ranges from 0 to 1.

Examples of the present invention include an electrode for a magnesium battery. The electrode comprises a layer of copper, a layer of titanium applied to the copper layer, a layer of platinum applied to the titanium layer, and an active material applied to the platinum layer. The active material is an alloy of bismuth and antimony. Electrodes may be fabricated by any suitable method. For example, the anode active material consisting of antimony and bismuth alloy may be electrodeposited on the current collector.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. A magnesium-ion battery comprising:
   a first electrode, including an active material, the active material having a particulate form;
   a second electrode;
   an electrolyte disposed between the first electrode and the second electrode, the electrolyte including a magnesium compound,
   the active material including an inter-metallic compound of magnesium and antimony when discharged.

2. The magnesium ion battery of claim 1 wherein the first electrode includes antimony.

3. The magnesium ion battery of claim 1, wherein the first electrode is a negative electrode, and the second electrode is a positive electrode.

4. The magnesium battery of claim 3, wherein the second electrode includes a cathode active material which shows electrochemical reaction at higher electrode potential than the first electrode.

5. The magnesium battery of claim 1 wherein the active material includes $Mg_3Sb_2$.

6. The magnesium battery of claim 2 wherein the active material includes antimony metal when charged.

7. The magnesium battery of claim 3 wherein the negative electrode includes a binder, an electrically conducting material, and the active material.

* * * * *